United States Patent Office 3,524,042
Patented Aug. 11, 1970

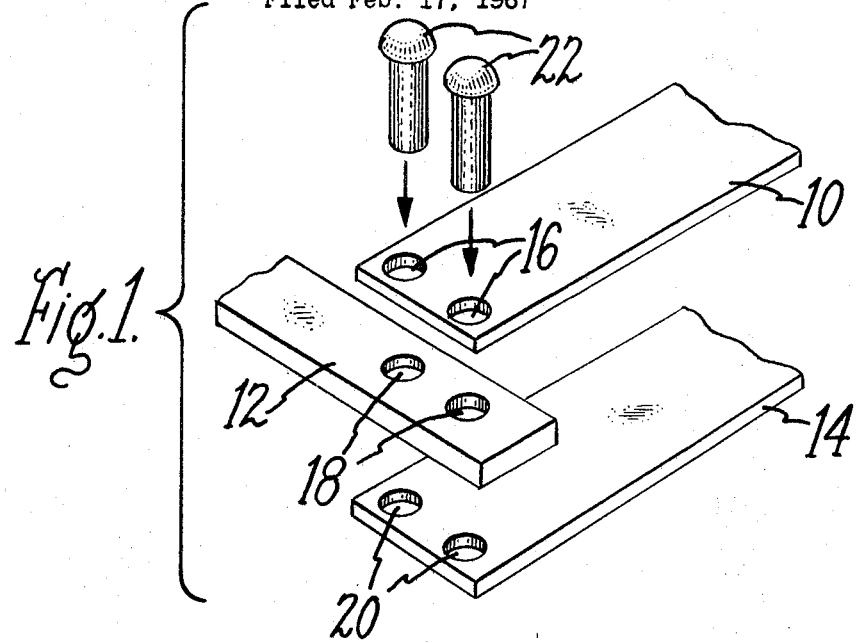
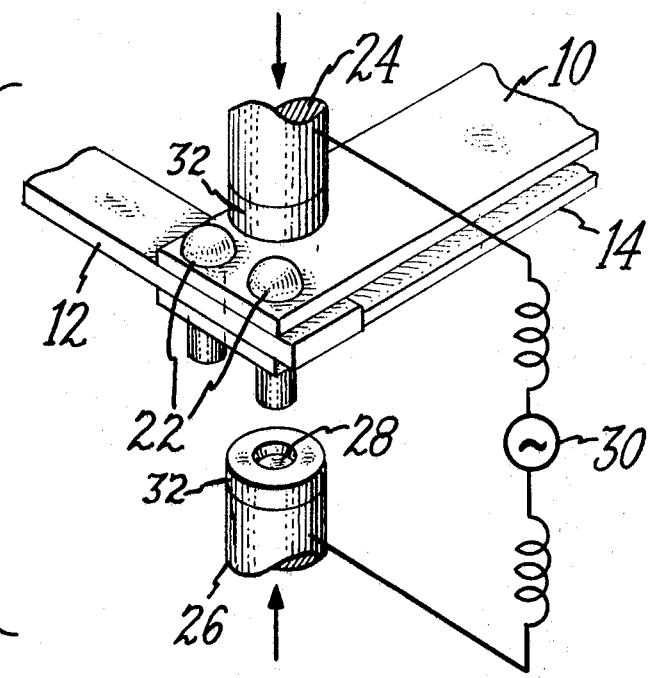
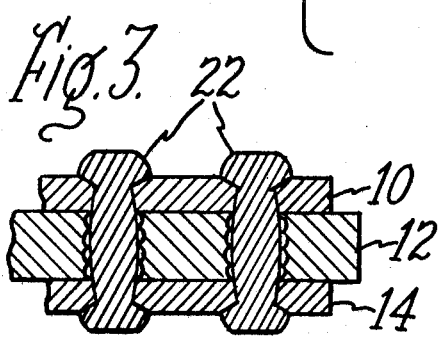
Fig.1.
Fig.2.
Fig.3.
Inventor,
Moreland P. Bennett,
by Francis K. Doyle
His Attorney.

3,524,042
METHOD OF MAKING MECHANICAL
AND WELDED JOINT
Moreland P. Bennett, Pittsfield, Mass., assignor to General
Electric Company, a corporation of New York
Filed Feb. 17, 1967, Ser. No. 622,011
Int. Cl. B21j 5/08; H05b 1/00
U.S. Cl. 219—150                              1 Claim

ABSTRACT OF THE DISCLOSURE

A combined mechanical and welded joint comprising three or more overlapped strips of metal. Holes are drilled or pierced through the overlapped metal and rivets set in such holes. A resistance welding electrode is brought in contact with opposite ends of the rivets with sufficient heat and pressure to upset the rivets and form rivet heads and weld the rivets to the overlapped metal.

BACKGROUND OF INVENTION

This invention relates to metallic joints and more particularly to a combined mechanical and welded joint and the method of making such welded joint. The invention finds special utility in the electrical industry.

It is often necessary to join metal members with a secure mechanical joint which has very low electrical resistance. These types of joints are frequently used in the electrical industry to connect leads or straps to electrical coils and the like. In many instances, the various metal members are of varying thicknesses and sometimes are of dissimilar metal. For example, many electrical coils are wound from aluminum wire while the leads to such coils are usually made of copper. Of course, many coils are also wound of copper wire with copper leads secured thereto, while some coils are of aluminum wire and have aluminum leads secured thereto. In all such types of coils, it is necessary that the joint between lead and the wire be mechanically strong and of very low electrical resistance.

It is well known to use either a welding or a brazing process for forming these desired joints. However, in many instances, the process is considered too expensive or time consuming and many times, it does not lend itself to production line use. Further, many of these known processes are not useful for joining dissimilar metals. It has recently been discovered that by use of the riveting, welding technique of this invention, that metal members may be joined together providing a secure mechanical, electrical joint regardless of whether the metals are similar or dissimilar metals.

SUMMARY OF INVENTION

It is therefore, one object of this invention to provide a riveted, welded joint which may be used to join either similar or dissimilar metals.

Another object of this invention is to provide a novel, welded riveted joint which will provide a strong mechanical connection with very low electrical resistance for use in electrical apparatus.

In carrying out this invention in one form, the metal to be joined is assembled with overlapping portions and holes are made through such overlapped portions. Rivets are placed in the holes and welded electrodes applied to opposite ends of the rivets. Heat is applied to the electrodes to upset the rivets and weld the rivets to the overlapped metal.

The invention which is sought to be protected will be particularly pointed out and distinctly claimed in the claim appended hereto. However, it is believed that this invention and the manner in which its various objects and advantages are obtained as well as other objects and advantages thereof will be more clearly understood from the following detailed description of a preferred embodiment thereof, especially when considered in the light of the accompanying drawings.

BRIEF DESCRIPTION OF THE DRAWINGS

FIG. 1 is an exploded perspective view of a preferred method of making the welded, riveted joint of this invention;

FIG. 2 is a perspective view of the assembled joint according to this invention prior to welding; and FIG. 3 is a sectional view through the welded, riveted joint of this invention.

DESCRIPTION OF PREFERRED EMBODIMENT

It has been discovered that a good, low-resistance, high-mechanical strength joint may be formed between similar or dissimilar metals by the use of rivets and welding. The metals to be joined are placed in overlapping relation and holes formed in the overlapped portion of the metal. Rivets are set in these holes and welding electrodes applied to opposite ends of the rivets. Heat and pressure from the welding electrodes upsets the rivets and welds them to the overlapped metal. The welding electrodes will heat the rivets sufficiently to cause them to weld along their shanks to the metals being joined. The process is especially useful in joining copper leads to aluminum wire wound coils.

Where copper and aluminum are to be joined by the method of this invention, it has been found that copper is preferably first tin plated. It is also considered desirable to use tin plated copper rivets for use in assembling the welded joint. In such instances it has been found desirable to place the aluminum between the strips of copper to prevent undue melting of the aluminum during the welding step. Of course, silver plating may be used, if desired. However, tin plating is preferred because of its lower cost.

Referring now to the drawings in which like numerals are used to indicate like parts throughout, FIG. 1 shows an exploded perspective view of the present preferred method of making the novel joint of this invention. As shown in FIG. 1, three metal members 10, 12 and 14 are placed in overlapped relation. Holes 16, 18 and 20 respectively are preferably simultaneously drilled or punched in the overlapped portions of the metal members 10, 12 and 14. Of course, it will be understood that the holes may be formed prior to the assembly of the overlapped metals as shown in FIG. 1. The holes must be formed in a complimentary manner so as to accept the rivets 22. As shown, rivets 22 are then placed in holes 16, 18 and 20 as is indicated by the arrows of FIG. 1.

Referring now to FIG. 2, the assembled joint is shown with the rivets 22 in place in metal members 10, 12 and 14. As can be seen, the rivets 22 extend some length beyond the assembled metal members. Welding electrodes 24 and 26 are then brought in contact with the opposite ends of the rivets 22 as indicated. The welding electrodes 24 and 26 are provided with recesses as shown at 28 of electrode 26 to accept and form the rivet heads. The electrodes 24 and 26 are connected to a source of electrical energy as indicated at 30 such that, when the electrodes contact opposite ends of the rivets 22, a welding current flows through the rivets 22. Sufficient pressure is applied to the electrodes as is indicated by the arrows so that the heated rivets will be upset to form a head against lower metal members.

In the preferred method of the invention, refractory material, or other high resistance material is used for tips 32. With such material, the tips 32 supply the main heat to rivets 22.

FIG. 3 shows a sectional view of a welded joint made according to this invention. As can be seen from FIG. 3, the rivet heads of the rivets 22 have been depressed into the metal members 10 and 14. They have also been welded to these metal members. The shanks of the rivet 22 have increased in diameter and are welded to the metal surrounding the holes in the metal members 10 and 14. Also, the welding heat has caused the members 12 and the members 10 and 14 to melt and flow together. Further, the shanks of rivets 22 have also enlarged in diameter in the holes of member 12 and the heat has caused welding between the shank and the material surrounding such holes.

In one test of this invention, two .020" x .500" copper leads were joined to a .130" x .225" aluminum wire. The copper leads were tin plated and placed on opposite sides of the aluminum wire. Holes were drilled through the overlapped parts and a .062" tin plated copper rivet placed in each drilled hole. The rivets extended approximately .093" beyond the assembled metal members. Welding electrodes with refractory tips having recesses of .187" diameter and .035" deep were placed in contact with the rivets with a welding current of substantially 4,000 amperes and a pressure of substantially 100 pounds for approximately 1 second. The resulting joint was similar to that described above with reference to FIG. 3. The joint was subjected to short circuit and thermal cycling tests which showed substantially no change in either the temperature rise of the resistance of the joint during the tests. Also, tests were made to determine the resistance of such joint and found to have extremely low resistance. From this, it is clear that the welded joint of this invention provides a low-resistance strong joint which finds special utility in the electrical apparatus field.

While there has been shown and described the present preferred embodiment of this invention, it will be clear that various changes may be made by those skilled in the art. It will be apparent that more than one strip may be placed on each side of the wire, if desired. These and other changes may be made without departing from the spirit and scope of the invention.

What is claimed as new and which it is desired to secure by Letters Patent of the United States is:

1. A method of making a welded joint comprising the steps of
   (a) assembling a sandwich of copper and aluminum metals to be joined in overlapping relation, with the aluminum in the center thereof,
   (b) forming complementary holes in said overlapped metals,
   (c) placing copper rivets in said holes,
   (d) placing welding electrodes having high resistance tips against said rivets,
   (e) applying current and pressure to said electrodes,
      (1) said pressure upsetting said rivets and expanding the shanks of said rivets,
      (2) and said current heating said tips which provide heat to said rivets to fusion bond said rivets, including said shanks to said metal members.

References Cited
UNITED STATES PATENTS 2,277,611    7/1941    Frischman _____ 219—150.5
3,039,798    6/1962    Carlson et al. _____ 219—150.5

JOSEPH V. TRUHE, Primary Examiner

L. A. ROUSE, Assistant Examiner